(12) United States Patent
Huang

(10) Patent No.: US 11,881,174 B2
(45) Date of Patent: Jan. 23, 2024

(54) OLED DRIVE CIRCUIT FOR DETECTING AND COMPENSATING DATA VOLTAGE

(71) Applicant: HKC CORPORATION LIMITED, Shenzhen (CN)

(72) Inventor: Xueyong Huang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/065,743

(22) Filed: Dec. 14, 2022

(65) Prior Publication Data

US 2023/0298527 A1 Sep. 21, 2023

(30) Foreign Application Priority Data

Mar. 16, 2022 (CN) .......................... 202210258047.2

(51) Int. Cl.
*G09G 3/3258* (2016.01)
*G09G 3/3291* (2016.01)

(52) U.S. Cl.
CPC ......... *G09G 3/3258* (2013.01); *G09G 3/3291* (2013.01); *G09G 2320/043* (2013.01)

(58) Field of Classification Search
CPC .................................................. G09G 3/3258
USPC .......................................................... 345/76
See application file for complete search history.

(56) References Cited

U.S. PATENT DOCUMENTS

| | | | |
|---|---|---|---|
| 2010/0220117 A1 | 9/2010 | Kimura | |
| 2015/0243203 A1* | 8/2015 | Kim | G09G 3/3291 345/212 |
| 2018/0204516 A1 | 7/2018 | Hwang et al. | |
| 2019/0385525 A1 | 12/2019 | Jin et al. | |
| 2020/0388218 A1 | 12/2020 | Han et al. | |
| 2022/0122545 A1* | 4/2022 | Hong | H10K 50/11 |
| 2022/0148517 A1* | 5/2022 | Kim | G09G 3/3233 |

FOREIGN PATENT DOCUMENTS

| | | |
|---|---|---|
| CN | 105741777 A | 7/2016 |
| CN | 107390406 A | 11/2017 |
| CN | 109754736 A | 5/2019 |
| CN | 111445852 A | 7/2020 |
| CN | 112562557 A | 3/2021 |
| CN | 113327556 A | 8/2021 |
| CN | 114005412 A | 2/2022 |
| KR | 20160078867 A1 | 7/2016 |

* cited by examiner

*Primary Examiner* — Long D Pham

(74) *Attorney, Agent, or Firm* — Maier & Maier, PLLC

(57) ABSTRACT

An OLED drive circuit and an OLED display device. The OLED drive circuit includes a sub-drive circuit, a sub-switch circuit, a sub-detection circuit and a sub-compensation circuit; the sub-drive circuit is configured to output a driving voltage to an OLED; the sub-detection circuit is configured to detect the driving voltage of the sub-drive circuit when a circuit path between the sub-drive circuit and the OLED is disconnected; and the sub-compensation circuit is configured to output a data voltage output by the data line according to the driving voltage detected by the sub-detection circuit. According to the OLED drive circuit, a change of the driving current flowing into the OLED can be reduced, and an image quality of the OLED display device can be improved accordingly.

16 Claims, 3 Drawing Sheets

OLED DRIVE CIRCUIT FOR DETECTING AND COMPENSATING DATA VOLTAGE

CROSS-REFERENCE TO RELATED APPLICATION

Pursuant to 35 U.S.C. § 119 and the Paris Conversion, this application claims priority to Chinese Patent Application No. 202210258047.2 filed Mar. 16, 2022, the entire contents of which are incorporated herein by reference.

TECHNICAL FIELD

The present application relates to the field of liquid crystal display technologies, and in particular, to an OLED drive circuit and an OLED display device.

BACKGROUND

Organic light emitting diode (Organic Light Emitting Diode, OLED) display devices are more and more widely used in products such as televisions and mobile phones due to their characteristics of thin and lightness, energy-saving, wide viewing angle, wide color gamut, high contrast, etc.

Where OLED is a current driving device, and a driving current is provided to the OLED through an OLED drive circuit during operation of the OLED. When a current flows through the OLED, the OLED emits light, and the luminance of the OLED is determined by the current flowing through the OLED.

Due to aging of materials of a thin film transistor (Thin Film Transistor, TFT) in application process of the TFT, a threshold voltage of the driving TFT in the OLED drive circuit may be drifted, a change of a driving current of the OLED may be caused, and an image quality of the OLED display device is further affected.

SUMMARY

In view of this, an OLED drive circuit and an OLED display device are provided in the present application, the OLED drive circuit and the OLED display device aim at decreasing the change of the driving current in the OLED of the OLED drive circuit, and thereby improving an image quality of the OLED display device.

In order to achieve the aforesaid objective, in the first aspect, an OLED drive circuit is provided in the embodiments of the present application, the OLED drive circuit includes:

a sub-drive circuit, a sub-switch circuit, a sub-detection circuit, and a sub-compensation circuit.

An input of the sub-drive circuit is electrically connected to an output of a data line, and the sub-drive circuit is configured to output a driving voltage to an OLED.

The sub-switch circuit is connected between the sub-drive circuit and the OLED, and is configured to connect or disconnect a circuit path between the sub-drive circuit and the OLED.

An input of the sub-detection circuit is electrically connected to an output of the sub-drive circuit, and the sub-detection circuit is configured to detect a driving voltage of the sub-drive circuit when the circuit path between the sub-drive circuit and the OLED is disconnected by the sub-switch circuit.

An input of the sub-compensation circuit is electrically connected to an output of the sub-detection circuit, an output of the sub-compensation circuit is electrically connected to an input of the data line, and the sub-compensation circuit is configured to adjust a data voltage output by the data line according to the driving voltage detected by the sub-detection circuit.

In some embodiments, the sub-switch circuit includes a first switching transistor and a first scanning line, wherein a gate electrode of the first switching transistor is electrically connected to the first scanning line, a source electrode of the first switching transistor is electrically connected to the output of the sub-drive circuit, and a drain electrode of the first switching transistor is electrically connected to an anode of the OLED.

In some embodiments, the first switching transistor is configured to be switched on when receiving a high level signal output by the first scanning line or be switched off when receiving a low level signal output by the first scanning line.

In some embodiments, the first switching transistor is a P-type field effect thin film transistor (TFT).

In some embodiments, the sub-detection circuit includes: a second switching transistor, a second scanning line, a third switching transistor, a third scanning line, a voltage sensor and a resistor. A gate electrode of the second switching transistor is electrically connected to the second scanning line, a source electrode of the second switching transistor is electrically connected to the output of the sub-drive circuit, a drain electrode of the second switching transistor is electrically connected to one end of the resistor, and the other end of the resistor is grounded. A gate electrode of the third switching transistor is electrically connected to the third scanning line, a source electrode of the third switching transistor is electrically connected to the output of the sub-drive circuit, and a drain electrode of the third switching transistor is electrically connected to an input of the voltage sensor.

In some embodiments, the second switching transistor is configured to be switched on when receiving a high level signal output by the second scanning line or be switched off when receiving a low level signal output by the second scanning line.

The third switching transistor is configured to be switched on when receiving a high level signal output by the third scanning line or be switched off when receiving a low level signal output by the third scanning line.

In some embodiments, both the second switching transistor and the third switching transistor are P-type field effect thin film transistors.

In some embodiments, the sub-drive circuit includes a fourth switching transistor, a fourth scanning line, a driving TFT and a capacitor. A gate electrode of the fourth switching transistor is electrically connected to the fourth scanning line, a source electrode of the fourth switching transistor is electrically connected to an output of the data line, and a drain electrode of the fourth switching transistor is electrically connected to a gate electrode of the driving TFT. A source electrode of the driving TFT is electrically connected to a power source, a drain electrode of the driving TFT is configured to output the driving voltage, and two ends of the capacitor are electrically connected to the gate electrode and the source electrode of the driving TFT, respectively.

In some embodiments, the power supply has a high potential voltage.

In the second aspect, an OLED display device is provided in one embodiment of the present application, the OLED display device includes the aforesaid OLED drive circuit.

The OLED drive circuit and the OLED display device provided in the embodiments of the present application include the sub-drive circuit, the sub-switch circuit, the sub-detection circuit and the sub-compensation circuit. Where the input of the sub-drive circuit is electrically connected to the output of the data line, and the sub-drive circuit is configured to output the driving voltage to the OLED. The sub-switch circuit is connected between the sub-drive circuit and the OLED, and is configured to connect or disconnect the circuit path between the sub-drive circuit and the OLED. The input of the sub-detection circuit is electrically connected to the output of the sub-drive circuit, and the sub-detection circuit is configured to detect the driving voltage of the sub-drive circuit when the circuit path between the sub-drive circuit and the OLED is disconnected by the sub-switch circuit. The input of the sub-compensation circuit is electrically connected to the output of the sub-detection circuit, the output of the sub-compensation circuit is electrically connected to the input of the data line, and the sub-compensation circuit is configured to adjust the data voltage output by the data line according to the driving voltage detected by the sub-detection circuit. In the aforesaid technical solutions of the OLED drive circuit, the sub-detection circuit and the sub-compensation circuit which are connected to the output of the sub-drive circuit can detect the driving voltage at the output of the sub-drive circuit, and adjust the data voltage at the input of the sub-drive circuit based on the driving voltage, such that the driving current at the output of the sub-drive circuit can be adjusted, the change of the driving current flowing into the OLED can be reduced, and the image quality of the OLED display device can be further improved. Furthermore, when the driving voltage of the sub-drive circuit is detected, the circuit path between the sub-drive circuit and the OLED can be disconnected through the sub-switch circuit, so that the OLED is switched off and would not emit light. Thus, the user can be prevented from observing an unadjusted image having inhomogeneous display brightness. Therefore, the driving voltage of the sub-drive circuit can be detected when black screen data and bright screen data are displayed during a startup stage of the OLED display device, more comprehensive driving voltage data can be obtained, a precision of compensation of the driving current of the OLED is improved, and the image quality of the OLED display device can be further improved accordingly.

DETAILED DESCRIPTION OF THE EMBODIMENTS

The embodiments of the present application are described below with reference to the accompanying drawings in the embodiments of the present application. The terms used in the embodiments of the present application are only used for explaining the embodiments of the present application, but not intended to limit the present application. The embodiments described below may be combined with each other, and the same or similar concepts or processes in these embodiments may not be repeatedly described in some embodiments.

Figure 1:
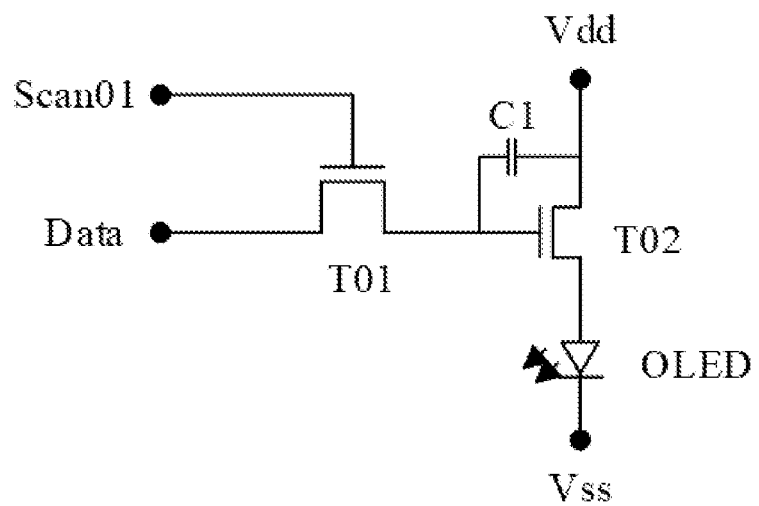
FIG. 1 illustrates a schematic circuit configuration of one OLED drive circuit according to one embodiment of the present application.

FIG. 1 illustrates a schematic circuit diagram of an organic light emitting diode (Organic Light Emitting Diode, OLED) drive circuit according to one embodiment of the present application, as shown in FIG. 1, the OLED drive circuit may include a switching transistor T01, a scanning line Scan01, a driving thin film transistor (Thin Film Transistor, TFT) T02, and a capacitor C1.

A gate electrode of the switching transistor T01 is electrically connected to the scanning line Scan 01, a source electrode of the switching transistor T01 is electrically connected to an output of the data line Data, and a drain electrode of the switching transistor T01 is electrically connected to a gate electrode of the driving TFT T02.

A source electrode of the driving TFT T02 is electrically connected to the power supply Vdd, a drain electrode of the driving TFT T02 is configured to output a driving voltage, and the driving TFT T02 is configured to drive the OLED to emit light.

Two ends of the capacitor C1 are electrically connected to the gate electrode and the source electrode of the driving TFT T02, respectively. When the switching transistor T01 is switched on, the capacitor C1 stores electric energy through the data voltage output by the data line Data, and releases the electric energy when the switching transistor T01 is switched off, so that the driving TFT T02 is kept to be switched on. The brightness of the OLED changes with the change of the driving current of the OLED, and the driving current of the OLED may be controlled by the data voltage Vdata.

In particular, the driving current of the OLED may be determined according to the formula expressed as follows:

$$I_{OLED}=K[Vdd-(\text{Vdata}-Vth)]^2$$

Where $I_{OLED}$ represents the driving current of the OLED, K represents a conversion coefficient of the driving TFT T02, Vdd represents a supply voltage of the power supply Vdd, Vth represents a threshold voltage of the driving TFT T02.

The threshold voltage of the driving TFT is a key parameter for measuring the performance of the driving TFT. In practical application, due to reasons such as the aging of the material of the driving TFT, the threshold voltage of the driving TFT in the OLED drive circuit may be drifted, so that the driving current of the OLED is changed, inhomogeneous display brightness of the various OLEDs in the OLED display device are caused, and the image quality of the OLED display device is influenced accordingly.

Figure 2:
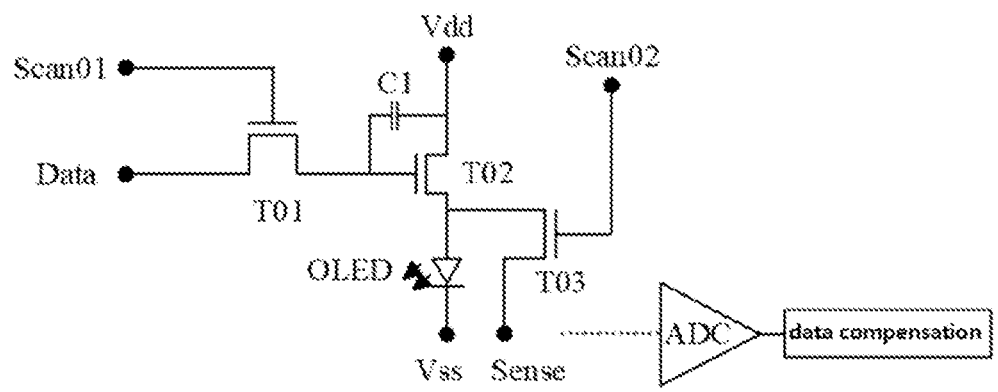
FIG. 2 illustrates a schematic circuit configuration of another OLED drive circuit according to one embodiment of the present application.

FIG. 2 illustrates a schematic circuit configuration of another OLED drive circuit according to one embodiment of the present application. As shown in FIG. 2, in order to solve the problem mentioned above, a feasible technical solution is to add a switching transistor T03 and a corresponding scanning line Scan02 in a pixel area of the OLED display device, and connect a voltage sensor Sense to a drain electrode of the switching transistor T03. Where a gate electrode scanning line Scan02 of the switching transistor T03 is electrically connected, a source electrode of the switching transistor T03 is electrically connected to a drain electrode of the switching transistor T02, and the drain electrode of the switching transistor T03 is electrically connected to the voltage sensor Sense.

During a startup stage of the OLED device, the scanning line Scan02 is controlled to output a high level to enable the switching transistor T03 to be switched on, the OLED driving voltage is detected and returned by the voltage sensor Sense, a change value of the driving voltage of the OLED is obtained according to the driving voltage of the OLED and a standard driving voltage of the OLED after performing an analog-to-digital conversion on the OLED driving voltage. Finally, data compensation is performed according to the obtained change value, that is, the data voltage output by the data line is compensated.

In a specific application of this technical solution, the driving voltage of the OLED can be detected when the black picture is displayed in the startup stage. When the bright picture is displayed, no detection is performed, so that an observation of an unadjusted image with inhomogeneous display brightness of the OLED caused due to light emission of the OLED during detection is avoided.

In this technical solution, due to the fact that the driving voltage can only be detected when the black picture is displayed, the precision of compensation is limited. In view of this, another OLED drive circuit is provided in one embodiment of the present application, this OLED device is used to improve the precision of compensation while reducing the change of the driving current of the OLED in the OLED drive circuit.

Figure 3:
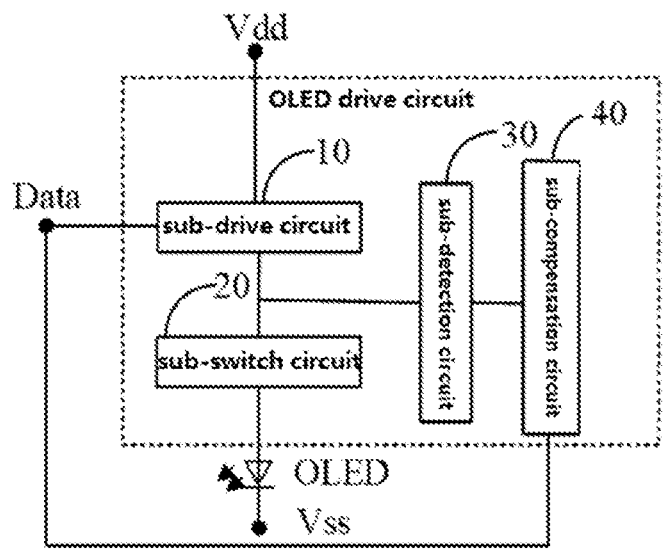
FIG. 3 is a schematic structural diagram of an OLED display device according to one embodiment of the present application.

FIG. 3 illustrates a schematic structural diagram of an OLED display device according to one embodiment of the present application. As shown in FIG. 3, the OLED display device may include: a power supply Vdd, a data line Data, an OLED drive circuit, and an OLED.

The OLED drive circuit may include a sub-drive circuit 10, a sub-switch circuit 20, a sub-detection circuit 30, and a sub-compensation circuit 40.

The power supply VDD may output a stable high potential voltage so as to provide a stable voltage to the sub-drive circuit 10.

An input of the sub-drive circuit 10 is electrically connected to an output of the data line Data, and the sub-drive circuit 10 is configured to output a driving voltage to the OLED.

The sub-switch circuit 20 is connected between the sub-drive circuit 10 and the OLED, and is configured to connect or disconnect a circuit path between the sub-drive circuit 10 and the OLED.

An input of the sub-detection circuit 30 is electrically connected to an output of the sub-drive circuit 10, and the sub-detection circuit 30 is configured to detect a driving voltage of the sub-drive circuit 10 when the circuit path between the sub-drive circuit 10 and the OLED is disconnected by the sub-switch circuit 20.

An input of the sub-compensation circuit 40 is electrically connected to an output of the sub-detection circuit 30, an output of the sub-compensation circuit 40 is electrically connected to an input of the data line Data, and the sub-compensation circuit 40 is configured to adjust a data voltage output by the data line Data according to the driving voltage detected by the sub-detection circuit 30.

Figure 4:
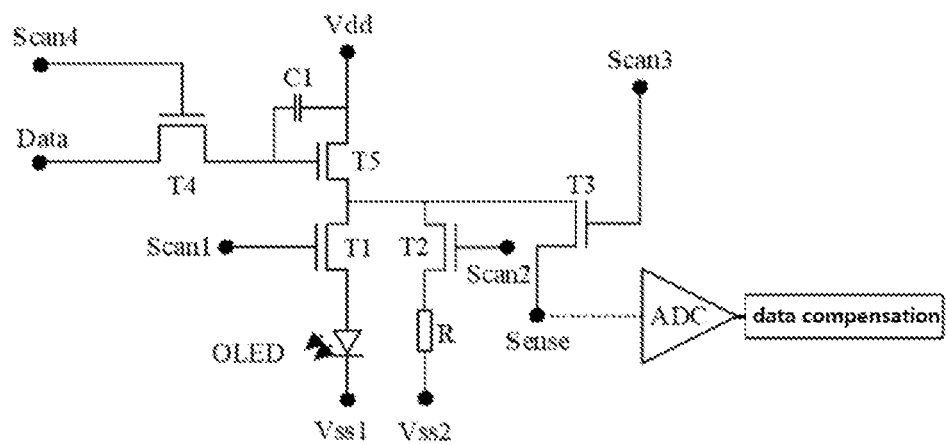
FIG. 4 is a schematic circuit configuration of an OLED drive circuit as shown in FIG. 3.

FIG. 4 is a schematic circuit configuration of the OLED drive circuit shown in FIG. 3. As shown in FIG. 4, the sub-switch circuit 20 may include a first switching transistor T1 and a first scanning line Scan1.

A gate electrode of the first switching transistor T1 is electrically connected to the first scanning line Scan1, a source electrode of the first switching transistor T1 is electrically connected to an output of the sub-drive circuit 10, a drain electrode of the first switching transistor T1 is electrically connected to an anode of the OLED, and a cathode of the OLED is grounded.

The first scanning line Scan1 is configured to control switching on and switching off of the first switching transistor T1. Optionally, when the first scanning line Scan1 outputs a high level signal, the first switching transistor T1 is switched on. When the first scanning line Scan1 outputs a low level signal, the first switching transistor T1 is switched off.

The first switching transistor T1 may be a PNP type triode, and the first switching transistor T1 may also be a P-type field effect thin film transistor, so that the power consumption of the circuit is reduced.

The sub-detection circuit 30 may include a second switching transistor T2, a second scanning line Scan2, a third switching transistor T3, a third scanning line Scan3, a voltage sensor Sense, and a resistor.

A gate electrode of the second switching transistor T2 is electrically connected to the second scanning line Scan2, a source electrode of the second switching transistor T2 is electrically connected to the output of the sub-driver circuit 10, a drain electrode of the second switching transistor T2 is electrically connected to one end of the resistor, and the other end of the resistor is grounded.

The second scanning line Scan2 is configured to control switching on and switching off of the second switching transistor T2. Optionally, when the second scanning line Scan2 outputs a high level signal, the second switching transistor T2 is switched on. When the second scanning line Scan2 outputs a low level signal, the second switching transistor T2 is switched off.

A gate electrode of the third switching transistor T3 is electrically connected to the third scanning line Scan3, a source electrode of the third switching transistor T3 is electrically connected to the output of the sub-drive circuit 10, and a drain electrode of the third switching transistor T3 is electrically connected to an input of the voltage sensor Sense.

The third scanning line Scan3 is configured to control switching on and switching off of the third switching transistor T3. Optionally, when the third scanning line Scan3 outputs a high level signal, the third switching transistor T3 is switched on. When the third scanning line Scan 3 outputs a low level signal, the third switching transistor T3 is switched off.

The second switching transistor T2 and the third switching transistor T3 may be PNP type triodes, and the second switching transistor T2 and the third switching transistor T3 may also be P-type field effect thin film transistors, so that the power consumption of the circuit is reduced.

The sub-compensation circuit 40 may be integrated into a main control chip, or be a part of a peripheral circuit of the main control chip. The sub-compensation circuit 40 may include an analog-to-digital converter (Analog-to-Digital Converter, ADC) and a data compensation unit.

After receiving the driving voltage transmitted from the sub-detection circuit 30, the sub-compensation circuit 40 may convert the driving voltage into a driving voltage change value through an analog-to-digital conversion process, and finally adjust the data voltage output by the data line Data according to the driving voltage change value.

The sub-drive circuit 10 may include a fourth switching transistor T4, a fourth scanning line Scan4, a driving thin film transistor (Thin Film Transistor, TFT) T5, and a capacitor C1.

A gate electrode of the fourth switching transistor T4 is electrically connected to the fourth scanning line Scan4, a source electrode of the fourth switching transistor T4 is electrically connected to the output of the data line Data, and a drain electrode of the fourth switching transistor T4 is electrically connected to a gate electrode of the driving TFT T5.

A source electrode of the driving TFT T5 is electrically connected to the power supply Vdd, and a drain electrode of the driving TFT T5 is configured to output the driving voltage.

Two ends of the capacitor C1 are electrically connected to the gate electrode and the source electrode of the driving TFT T5, respectively.

Figure 5:
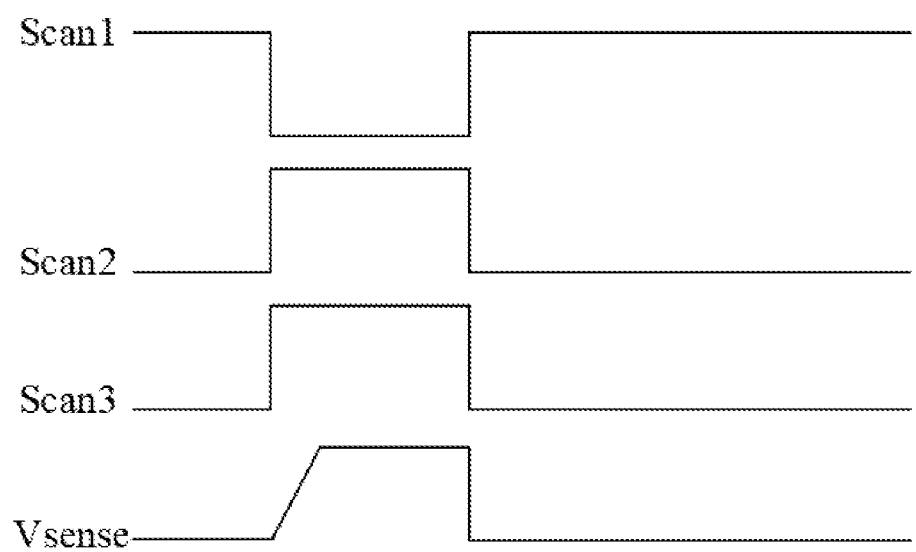
FIG. 5 illustrates a timing sequence diagram of the OLED drive circuit during operation according to one embodiment of the present application.

FIG. 5 illustrates a timing sequence diagram of the OLED drive circuit in operation according to one embodiment of the present application. As shown in FIG. 5, during voltage detection process, the first scanning line Scan1 outputs a low level signal to control the first switching transistor T1 to be switched off, the circuit path between the sub-drive circuit 10 and the OLED is switched off, so that the OLED does not display. Meanwhile, the second scanning line Scan2 outputs a high level signal to control the second switching transistor T2 to be switched on, the third scanning line Scan3 outputs a high level signal to control the third switching transistor T3 to be switched on, a circuit loop is formed between the sub-drive circuit 10 and the sub-detection circuit 30, the driving voltage of the OLED is detected by the voltage sensor Sense.

Due to the existence of the capacitor C1 in the OLED drive circuit, the voltage detected by the voltage sensor Sense is stable after a short period of time.

In particular, the first switching transistor T1 may be switched off within a period of time during the startup phase of the OLED display device, such that the OLED would not emit light. At the same time, the second switching transistor T2 and the third switching transistor T3 are switched on to detect the driving voltage of the OLED. Since the time OLED would not emit light, the OLED driving voltage can be detected when black screen data is displayed within this period of time, and the OLED driving voltage can be detected when bright screen data is displayed. Thus, more comprehensive driving voltage data can be obtained, the precision of compensation of the driving current of the OLED can be improved, and the image quality of the OLED display device can be further improved.

It can be understood that, the circuit modules illustrated in the embodiments of the present application are not constituted as specific limitation to the OLED drive circuit. In some other embodiments of the present application, the OLED drive circuit may include more or fewer circuit modules than those illustrated in the figures. As an alternative, some circuit modules may be combined. As yet another alternative, some circuit modules may be divided. The illustrated circuit modules shown in the figures may be implemented in the manner of hardware, software, or a combination of software and hardware.

The OLED drive circuit and the OLED display device provided in the embodiments of the present application include the sub-drive circuit, the sub-switch circuit, the sub-detection circuit and the sub-compensation circuit. Where the input of the sub-drive circuit is electrically connected to the output of the data line, and the sub-drive circuit is configured to output the driving voltage to the OLED. The sub-switch circuit is connected between the sub-drive circuit and the OLED, and is configured to connect or disconnect the circuit path between the sub-drive circuit and the OLED. The input of the sub-detection circuit is electrically connected to the output of the sub-drive circuit, and the sub-detection circuit is configured to detect the driving voltage of the sub-drive circuit when the circuit path between the sub-drive circuit and the OLED is disconnected by the sub-switch circuit. The input of the sub-compensation circuit is electrically connected to the output of the sub-detection circuit, the output of the sub-compensation circuit is electrically connected to the input of the data line, and the sub-compensation circuit is configured to adjust the data voltage output by the data line according to the driving voltage detected by the sub-detection circuit. In the aforesaid technical solutions of the OLED drive circuit, the sub-detection circuit and the sub-compensation circuit which are connected to the output of the sub-drive circuit can detect the driving voltage at the output of the sub-drive circuit, and adjust the data voltage at the input of the sub-drive circuit based on the driving voltage, such that the driving current at the output of the sub-drive circuit can be adjusted, the change of the driving current flowing into the OLED can be reduced, and the image quality of the OLED display device can be further improved. Furthermore, when the driving voltage of the sub-drive circuit is detected, the circuit path between the sub-drive circuit and the OLED can be disconnected through the sub-switch circuit, so that the OLED is switched off and would not emit light. Thus, the user can be prevented from observing an unadjusted image having inhomogeneous display brightness. Therefore, the driving voltage of the sub-drive circuit can be detected when black screen data and bright screen data are displayed during a startup stage of the OLED display device, more comprehensive driving voltage data can be obtained, a precision of compensation of the driving current of the OLED is improved, and the image quality of the OLED display device can be further improved accordingly.

In the various embodiments, the descriptions of these embodiments are emphasized respectively, regarding the part in some embodiments which is not described in detail, reference can be made to related descriptions in other embodiments.

It should be understood that, when a term "comprise/include" is used in the description and annexed claims, the term "comprise/include" indicates existence of the described characteristics, integer, steps, operations, elements and/or components, but not exclude existence or adding of one or more other characteristics, integers, steps, operations, elements, components and/or combination thereof.

The naming or numbering of the steps in the present application does not mean that the steps in the method procedure must be performed according to the time/logical order indicated by the naming or the numbering. The execution orders of the named or numbered method steps can be changed according to the technological objective to be achieved, as long as the same or similar technical effects can be achieved.

In the description of the present application, unless otherwise there is additional explanation, the character "/" generally indicates that there is a "or" relationship between two continuous associated objects, for example, A/B may represent A or represent B, "and/or" in the present application is only an association relationship that describes the associated objects and represents that there are three conditions. For example, A and/or B may represent three conditions including: A exists alone, A and B coexist, B exists alone. A and B may be singular or plural.

Furthermore, in the description of the present application, unless otherwise there is additional explanation, "a plurality of" refers to two or more than two. "At least one of the following items (numbers)" or similar expression refers to any combination of these items (numbers), including any combination of a single item (number) or multiple items (numbers). For example, "at least one of a, b or c" or "the least one of a, b, and c" may represent a, b, c, a-b, a-c, b-c or a-b-c; where a, b, and c may be singular or plural.

As is used in the description and the annexed claims, a term "if" may be interpreted as "when" or "once" or "in response to determination" or "in response to detection". Similarly, terms such as "if it is determined that", or "if it is detected that (a described condition or event)" may be interpreted as "once it is determined" or "in response to the determination" or "once it is detected that (the described condition or event)" or "in response to the detection (the described condition or event)".

Additionally, in the description of the specification and the annexed claims of the present application, terms such as "first", "second", "third" and the like are used to distinguish similar objects, and are not necessarily used for describing a specified order or sequence. It should be understood that the data used in this manner can be interchanged where appropriate, so that the embodiments described herein can be implemented in an order other than the orders in the contents illustrated or described herein.

The descriptions such as "referring to one embodiment" and "referring to some embodiments" as described in the specification of the present application means that a specific feature, a structure, or a feature which are described with reference to this embodiment are included in one or some embodiments of the present application. Thus, the sentences of "in one embodiment", "in some embodiments", "in some other embodiments" and the like in this specification are not necessarily referring to the same embodiment, but indicate "one or more embodiments instead of all embodiments", unless otherwise a special emphasis is provided in other manner.

Finally, it needs to be noted that, the various embodiments described above are merely used to explain the technical solutions of the present application, and are not intended to limit the technical solutions of the present application. Although the present application has been described in detail with reference to the embodiments described above, one of ordinary skill in the art should understand that the technical solutions described in these embodiments can still be modified, or some or all technical features in the embodiments can be equivalently replaced. However, these modifications or replacements do not make the essences of corresponding technical solutions to break away from the spirit and the scope of the technical solutions of the embodiments of the present application.

What is claimed is:

1. An OLED drive circuit, comprising: a sub-drive circuit, a sub-switch circuit, a sub-detection circuit, and a sub-compensation circuit;

wherein an input of the sub-drive circuit is electrically connected to an output of a data line, and the sub-drive circuit is configured to output a driving voltage to an OLED;

the sub-switch circuit is connected between the sub-drive circuit and the OLED, and is configured to connect or disconnect a circuit path between the sub-drive circuit and the OLED;

an input of the sub-detection circuit is electrically connected to an output of the sub-drive circuit, and the sub-detection circuit is configured to detect a driving voltage of the sub-drive circuit when the circuit path between the sub-drive circuit and the OLED is disconnected by the sub-switch circuit; and an input of the sub-compensation circuit is electrically connected to an output of the sub-detection circuit, an output of the sub-compensation circuit is electrically connected to an input of the data line, and the sub-compensation circuit is configured to adjust a data voltage output by the data line according to the driving voltage detected by the sub-detection circuit;

wherein the sub-detection circuit comprises: a second switching transistor, a second scanning line, a third switching transistor, a third scanning line, a voltage sensor and a resistor, wherein a gate electrode of the second switching transistor is electrically connected to the second scanning line, a source electrode of the second switching transistor is electrically connected to the output of the sub-drive circuit, a drain electrode of the second switching transistor is electrically connected to one end of the resistor, and the other end of the resistor is grounded; a gate electrode of the third switching transistor is electrically connected to the third scanning line, a source electrode of the third switching transistor is electrically connected to the output of the sub-drive circuit, and a drain electrode of the third switching transistor is electrically connected to an input of the voltage sensor.

2. The OLED drive circuit according to claim 1, wherein the sub-switch circuit comprises a first switching transistor and a first scanning line, wherein a gate electrode of the first switching transistor is electrically connected to the first scanning line, a source electrode of the first switching transistor is electrically connected to the output of the sub-drive circuit, and a drain electrode of the first switching transistor is electrically connected to an anode of the OLED.

3. The OLED drive circuit according to claim 2, wherein the first switching transistor is configured to be switched on when receiving a high level signal output by the first scanning line or be switched off when receiving a low level signal output by the first scanning line.

4. The OLED drive circuit according to claim 3, wherein the first switching transistor is a P-type field effect thin film transistor (TFT).

5. The OLED drive circuit according to claim 1, wherein the second switching transistor is configured to be switched on when receiving a high level signal output by the second scanning line or be switched off when receiving a low level signal output by the second scanning line; and the third switching transistor is configured to be switched on when receiving a high level signal output by the third scanning line or be switched off when receiving a low level signal output by the third scanning line.

6. The OLED drive circuit according to claim 5, wherein both the second switching transistor and the third switching transistor are P-type field effect thin film transistors.

7. The OLED drive circuit according to claim 1, wherein the sub-drive circuit comprises a fourth switching transistor, a fourth scanning line, a driving TFT and a capacitor, wherein a gate electrode of the fourth switching transistor is electrically connected to the fourth scanning line, a source electrode of the fourth switching transistor is electrically connected to an output of the data line, and a drain electrode of the fourth switching transistor is electrically connected to a gate electrode of the driving TFT; a source electrode of the driving TFT is electrically connected to a power source, a drain electrode of the driving TFT is configured to output the driving voltage, and two ends of the capacitor are electrically connected to the gate electrode and the source electrode of the driving TFT, respectively.

8. The OLED drive circuit according to claim 7, wherein the power supply has a high potential voltage.

9. An OLED display device which comprises an OLED drive circuit, the OLED circuit further comprising: a sub-drive circuit, a sub-switch circuit, a sub-detection circuit, and a sub-compensation circuit;
   wherein an input of the sub-drive circuit is electrically connected to an output of a data line, and the sub-drive circuit is configured to output a driving voltage to an OLED;
   the sub-switch circuit is connected between the sub-drive circuit and the OLED, and is configured to connect or disconnect a circuit path between the sub-drive circuit and the OLED;
   an input of the sub-detection circuit is electrically connected to an output of the sub-drive circuit, and the sub-detection circuit is configured to detect a driving voltage of the sub-drive circuit when the circuit path between the sub-drive circuit and the OLED is disconnected by the sub-switch circuit; and
   an input of the sub-compensation circuit is electrically connected to an output of the sub-detection circuit, an output of the sub-compensation circuit is electrically connected to an input of the data line, and the sub-compensation circuit is configured to adjust a data voltage output by the data line according to the driving voltage detected by the sub-detection circuit;
   wherein the sub-detection circuit comprises: a second switching transistor, a second scanning line, a third switching transistor, a third scanning line, a voltage sensor and a resistor, wherein a gate electrode of the second switching transistor is electrically connected to the second scanning line, a source electrode of the second switching transistor is electrically connected to the output of the sub-drive circuit, a drain electrode of the second switching transistor is electrically connected to one end of the resistor, and the other end of the resistor is grounded; a gate electrode of the third switching transistor is electrically connected to the third scanning line, a source electrode of the third switching transistor is electrically connected to the output of the sub-drive circuit, and a drain electrode of the third switching transistor is electrically connected to an input of the voltage sensor.

10. The OLED display device according to claim 9, wherein the sub-switch circuit comprises a first switching transistor and a first scanning line, wherein a gate electrode of the first switching transistor is electrically connected to the first scanning line, a source electrode of the first switching transistor is electrically connected to the output of the sub-drive circuit, and a drain electrode of the first switching transistor is electrically connected to an anode of the OLED.

11. The OLED display device according to claim 10, wherein the first switching transistor is configured to be switched on when receiving a high level signal output by the first scanning line or be switched off when receiving a low level signal output by the first scanning line.

12. The OLED display device according to claim 11, wherein the first switching transistor is a P-type field effect thin film transistor (TFT).

13. The OLED display device according to claim 9, wherein the second switching transistor is configured to be switched on when receiving a high level signal output by the second scanning line or be switched off when receiving a low level signal output by the second scanning line; and
   the third switching transistor is configured to be switched on when receiving a high level signal output by the third scanning line or be switched off when receiving a low level signal output by the third scanning line.

14. The OLED display device according to claim 13, wherein both the second switching transistor and the third switching transistor are P-type field effect thin film transistors.

15. The OLED display device according to claim 9, wherein the sub-drive circuit comprises a fourth switching transistor, a fourth scanning line, a driving TFT and a capacitor, wherein a gate electrode of the fourth switching transistor is electrically connected to the fourth scanning line, a source electrode of the fourth switching transistor is electrically connected to an output of the data line, and a drain electrode of the fourth switching transistor is electrically connected to a gate electrode of the driving TFT; a source electrode of the driving TFT is electrically connected to a power source, a drain electrode of the driving TFT is configured to output the driving voltage, and two ends of the capacitor are electrically connected to the gate electrode and the source electrode of the driving TFT, respectively.

16. The OLED display device according to claim 15, wherein the power supply has a high potential voltage.

\* \* \* \* \*